UNITED STATES PATENT OFFICE 2,260,337

ALKOXY-ARYL BORATE

Ralph F. Prescott, Robert C. Dosser, and John J. Sculati, Midland, Mich., assignors to The Dow Chemical Company, Midland, Mich., a corporation of Michigan No Drawing. Application October 16, 1939, Serial No. 299,699

3 Claims. (Cl. 260—462)

This invention concerns a novel group of aromatic borates having the general formula

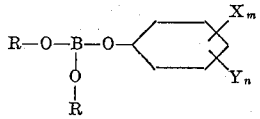

wherein R represents an aromatic radical, X represents a lower alkoxy radical containing from 1 to 8 carbon atoms, inclusive, Y represents halogen or hydrogen, and m and n are integers the sum of which is 5. These compounds are viscous liquids some of which solidify on standing. They are substantially odorless and colorless and somewhat soluble in most common organic solvents. On contact with water they decompose to give boric acid and free phenol. They are useful in the preparation of fungicidal and germicidal compositions, a particular application consisting of a substantially nonaqueous solution which may be diluted with water to obtain relatively fine dispersion of the particular phenol concerned in a dilute solution of boric acid.

The compounds are prepared by reacting a suitable phenol with boric acid, preferably in a media consisting of a water-immiscible organic solvent. In carrying out the reaction, the phenol and boric acid are dispersed in the solvent and the mixture heated to a reaction temperature, preferably between about 90° and 150° C., although somewhat higher or lower temperatures may be employed depending upon the particular solvent or phenol employed in the reaction mixture. Reaction is conveniently carried out at the boiling temperature of the mixture. During the reaction, water is formed by the reaction of the phenol with the acid and is distilled along with a portion of the organic solvent out of the reaction mixture. While any suitable proportion of the reactants may be employed, from about 2 to 4 molecular equivalents of the phenol for each molecular equivalent of boric acid have been found to give the desired compounds in good yield. The amount of organic solvent present in the reaction mixture is not critical provided only that sufficient of the solvent be maintained in the reaction zone to be steam-distilled along with the water formed. We generally employ sufficient of the solvent so that the phenol is dissolved during reaction and the final product is obtained in solution. When the reaction is completed, i. e. when the water is no longer evolved, the residue may be fractionally distilled to separate the residual solvent. After the solvent is distilled, the residue consists essentially of a mixture of organic borates in which the tri-aromatic borate predominates. This residue may be employed in the preparation of fungicidal and germicidal compositions without further purification. Where it is desired to obtain the borates in substantially pure form, the crude product may be fractionally distilled to separate the borate derivatives and to recover unreacted phenolic residues.

The following example sets forth certain embodiments of the invention but is not to be construed as limiting the same.

110 grams (1.02 mols) of ortho-cresol, 21 grams (0.34 mol) of boric acid, and 500 milliliters of ethyl benzene were mixed together and heated at 140° C., the boiling temperature of the mixture. A binary mixture of water and ethyl benzene was continuously distilled out of the reaction zone during the reaction. The vapor temperture of the distillate ranged between 130° and 136° C. The reaction was found substantially complete after 12 hours, and the mixture was thereafter cooled to room temperature and fractionally distilled under reduced pressure, whereafter there was recovered 493 milliliters of ethyl benzene and 73 grams of tri-orthotolyl borate, boiling at 198° C. at 0.1 inch pressure. This compound is a straw-colored viscous liquid, soluble in most organic solvents, and readily hydrolyzing on contact with water.

In a similar manner other alkyl and alkoxy-substituted phenols and halogen derivatives thereof were reacted with boric acid in the presence of such water-immiscible solvents as ortho-dichloro-benzene, chloro-benzene, propyl benzene, benzene, carbontetrachloride, ethylene chloride, and the like. Representative of the compounds so obtained were tri-(4-tertiarybutyl-phenyl) borate, boiling at 275°–280° C. at 0.1 inch pressure, and tri-(2-methoxy-phenyl) borate, boiling at 230° C. at 0.1 inch pressure. Other common phenols which may be similarly reacted with boric acid to obtain compounds analogous to those described above are 3,5-dimethyl phenol, 2,4,6-tri-tertiarybutyl phenol, tertiaryoctyl phenol, 2-n-hexyl phenol, 2-chloro-4-tertiarybutyl phenol, 2,6-dibromo-amyl-4-tertiaryamyl phenol, 2-methyl-4-tertiary-amyl phenol, 2,4-diisopropyl phenol, tetrachloro-cresol, thymol, carvacrol, 4-n-butoxy phenol, 2-octyloxy phenol, 2-chloro-4-n-propyloxy phenol, 2,6-dibromo-4-ethoxy phenol, 2-n-hexyl-4-iodo phenol, and the like.

While the compounds set forth in the foregoing examples are in each instance tri-aromatic derivatives of boric acid wherein the three substituting aromatic groups are similar, compounds in which dissimilar aryl, haloaryl and alkoxyaryl groupings are embodied may be prepared by reacting mixed phenols with boric acid. For example, such compounds as mono-(4-tertiary-butyl-phenyl)-diphenyl borate may be formed by reacting a mixture of 2 molecular equivalents of phenol and 1 molecular equivalent of 4-tertiary phenol with 1 molecular equivalent of boric acid. Similarly, isomeric mixtures of cresols, tertiarylbutyl phenols, isopropoxy phenols or halogen or alkyl derivatives thereof may be reacted with boric acid to obtain mixed tri-aromatic borates. Such compounds have particular utility where it is desired to obtain germicidal or fungicidal compositions which will be effective against a wide range of organisms, since many phenols are relatively specific in their action.

Other modes of applying the principle of our invention may be employed instead of those explained, change being made as regards the materials employed provided the products described by any of the following claims be thereby obtained.

We therefore particularly point out and distinctly claim as our invention:

1. A compound having the formula

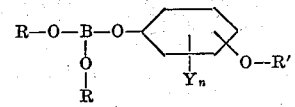

wherein R represents an aromatic radical, R' represents a lower alkyl radical containing from 1 to 8 carbon atoms, inclusive, Y represents a member of the group consisting of halogen and hydrogen, and $n$ is an integer not greater than 2.

2. A tri-(alkoxy-phenyl) borate wherein the alkyl radical of each alkoxy group contains from 1 to 8 carbon atoms.

3. Tri-(2-methoxy-phenyl) borate.

RALPH F. PRESCOTT.
ROBERT C. DOSSER.
JOHN J. SCULATI.